A. F. WARD.
METHOD OF MAKING PAN BISCUIT.
APPLICATION FILED JAN. 25, 1915.

1,144,953.

Patented June 29, 1915.

Witnesses:
Geo. E. Stebbins
A. C. Richardson

Inventor:
Ashley F. Ward
by his attorney
Phillips, Van Everen & Fish

UNITED STATES PATENT OFFICE.

ASHLEY F. WARD, OF BOSTON, MASSACHUSETTS, ASSIGNOR TO THE A. F. WARD MACHINERY CO., OF BOSTON, MASSACHUSETTS, A CORPORATION OF MASSACHUSETTS.

METHOD OF MAKING PAN-BISCUIT.

1,144,953. Specification of Letters Patent. Patented June 29, 1915.

Application filed January 25, 1915. Serial No. 4,271.

*To all whom it may concern:*

Be it known that I, ASHLEY F. WARD, a citizen of the United States, residing at Boston, in the county of Suffolk and State of Massachusetts, have invented certain new and useful Improvements in Methods of Making Pan-Biscuits; and I do hereby declare the following to be a full, clear, and exact description of the invention, such as will enable others skilled in the art to which it appertains to make and use the same.

The present invention relates to a method of making pan biscuit.

The object of the invention is to produce a better and more uniform pan of biscuit and at the same time to reduce the labor and cheapen the cost of production.

With this object in view, the invention consists in the method hereinafter described and particularly pointed out in the claims.

In making biscuit as heretofore generally done by the baking trade, the baker divides the dough into small parts each having the necessary amount of dough for a single biscuit. These are "balled up" by hand and are placed in the baking pan. In this process, each individual biscuit must be balled up by hand until the excess gas is worked out of it and it is completely enveloped in a skin, so that a considerable amount of labor has been required for making a pan of biscuit. In spite of the labor involved, it has heretofore been supposed that the biscuits should be balled up separately and then placed in the baking pan in order to produce a pan of biscuit having a good appearance and proper grain and texture.

According to the present invention the balling up of the individual biscuits is dispensed with, the desired grain and texture and outer skin being given to the dough by "rounding up" the entire piece of dough from which each pan of biscuit is made. Not only is any hand work on the individual biscuits done away with, but the biscuits made by the present method are of a more uniform grain and texture and have a better appearance when baked.

Figure 1:
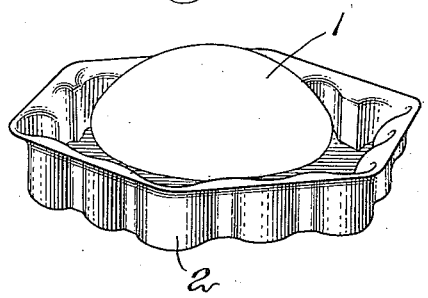
Figure 2:
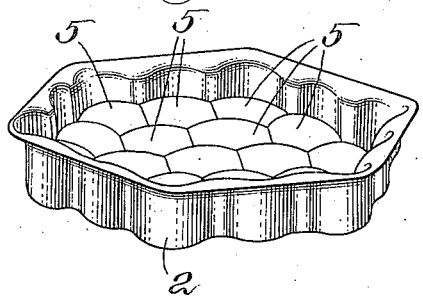
Figure 3:
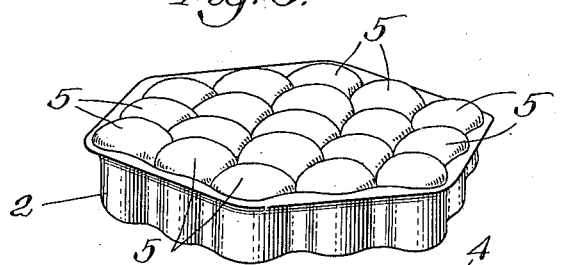
Figure 5:
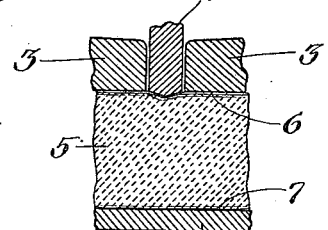
Figure 4:
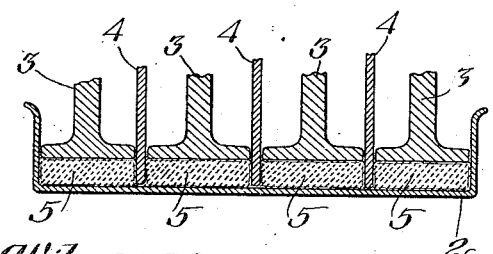
Figure 6:
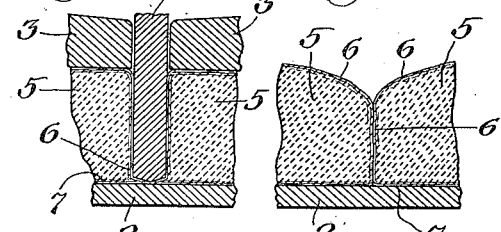
Figure 7:
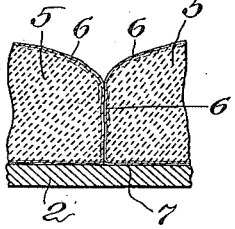

In the drawings which illustrate one form of the pan and dividing apparatus used in practising the present method, Figure 1 is a perspective view showing the rounded up piece of dough in the pan; Fig. 2 is a perspective view showing the dough after it is divided into fractional parts; Fig. 3 is a perspective view showing the subdivided dough after it is proofed and ready for the oven; Fig. 4 is a sectional view showing the operation of the plungers and dividers on the dough; and Figs. 5, 6 and 7 are detail views showing the operation of dividing the dough.

In order to enable those skilled in this art to practise the present invention and get good results, the preferred procedure of carrying out the method of the present invention, together with the preliminary steps of preparing the dough will now be described in detail.

While any good bread or biscuit dough may be used, a dough having the following ingredients has been found to give good results: flour, sixteen pounds; water, eight pounds; sugar, thirteen ounces; salt, three and one half ounces; lard, one pound; malt, three ounces; yeast, three ounces. The ingredients are thoroughly mixed in a dough mixer for about five minutes at a temperature of from eighty-one to eighty-three degrees Fahrenheit. The mixed dough is dumped into a trough and allowed to rise for three hours at room temperature. Then the dough is "turned" to knock out the gas and reduce its size. The dough is then allowed to rise for an hour and a quarter and again "turned." After this, the dough is allowed to rise for three quarters of an hour and again "turned" and "taken" from the trough. The total time in the trough is about five hours. A dough of this type is known to the trade as "soft" or bread dough as contrasted with the "hard" dough which is used for cracker making. Soft dough is made with yeast and depends for its rising qualities upon the gas produced in the dough by fermentation. The hard or cracker dough is usually raised with the gas evolved by the chemical decomposition of bicarbonate of soda. Hard and soft doughs have different characteristics and require different treatments. The present invention has to do with the treatment of soft dough.

After the dough is taken from the trough, it is divided into pieces either by machines known as loaf dividers or by hand, so that each of the pieces contains the proper amount of dough for a single pan of biscuit.

The pieces of dough are "rounded up" or balled up either by machine or by hand. The rounding up of a piece of dough expels the surplus gas, gives the piece of dough the grain and texture desired for the biscuit, and forms an outer skin which completely envelops the piece of dough. This rounding up of the pieces of dough from which the biscuits are subdivided is the only rounding up which is necessary in the process The rounded up piece of dough is proofed for ten to fifteen minutes to raise the dough somewhat, and then the proofed piece of dough is put into the baking pan. After the dough is put into the baking pan it is not removed until after the biscuit are baked. The dough is allowed to stand in the pan for ten to twenty minutes and to rise until it has the desired spring, the term "spring" being employed to denote the elasticity of the dough due to the proper amount of contained gas. This is for the purpose of getting the dough into such condition that the subsequently employed divider may properly draw down the top of the dough when the dough is subdivided into fractional biscuit parts. If the dough does not have the proper skin and is not properly proofed or raised, it will be flabby and the top of the dough will not be drawn down between the fractional parts to preserve the skin on the top of the dough. While it is preferred to put the dough through a proofer, then pan it, and afterward allow it to rise or proof a little more, it is obvious that the dough might be put into the pans before it is proofed at all or might be proofed to the requisite amount before it is put in the pans. Therefore, in the claims, I do not wish to be limited to a particular sequence of these panning and proofing operations.

The rounded up dough, after it has risen and is in the baking pan, is indicated in Fig. 1 of the accompanying drawings, in which the rounded up piece of dough is indicated by reference numeral 1 and the baking pan by reference numeral 2. The dough is then put through the machine known to the trade as the "Ward pan biscuit machine". The essential features of this machine are disclosed in my copending application, Serial No. 656,998. The machine which is used for making pan biscuit is a smaller machine than that illustrated in the drawings of said application. The machine illustrated in said application divides a larger piece of dough into thirty-seven parts, which is too many for a readily salable loaf of biscuit, while the machine which is used for making pan biscuit divides the dough into a smaller number of parts and makes a salable size pan of biscuit. With the baking pan illustrated in the drawings and the pan biscuit machine for which the pan is designed, the dough is divided into nineteen biscuit. The present method is indicated but is not claimed in said copending application. The baking pan 2 is a shallow, flat pan of the form designed particularly for use with the Ward pan biscuit machine. The machine has a flat presser which is made up of a number of plungers 3 which, as shown in said application, are carried by a plunger plate. The machine also has a divider which comprises a number of dough dividing blades 4, which subdivide the piece of dough. As shown in said application, and as employed in the commercial machine, the divider divides the dough into a number of fractional or biscuit parts of equal weight and having a uniform arrangement in the pan. The completed and baked pan of biscuit which is made in the particular form of pan shown in the drawings, is illustrated in my Design Patent No. 45,900. Examples of other forms of pan biscuit which may be made by changing the shape of the pan and of the divider, are indicated in my Design Patents Nos. 45,899, 47,060 and 47,061 and my copending application for design, Serial No. 874,086.

The plungers 3 and the divider blades 4 are moved against the piece of dough 1 in the pan. The plungers 3 engage the dough with a yielding pressure and flatten and compress the dough so that it fills the bottom of the pan, forming a layer of uniform thickness over the bottom of the pan as shown in Fig. 4. After the downward movement of the plungers is checked by the dough, the dividers 4 continue their downward movement independently of the plungers and subdivide the piece of dough into fractional biscuit parts 5 as illustrated in Fig. 4. Then the plunger and divider are lifted and the pan removed from the machine. The dough, after the operation of the machine has an appearance substantially like that shown in Fig. 2 of the drawings. The blunt edges of the divider engage and draw the dough down on the top as they pass through the body of the dough. In case the piece of dough has a tough ductile skin, the blunt edge of the dough divider blade carries the skin through the dough and pinches it off against the bottom of the pan. The illustrated form of dough dividing blade is that shown in the patent to Bierer, No. 1,098,552. As shown in Figs. 5, 6 and 7, the plungers 3 flatten out the dough, the divider 4 engages the top of the dough and passes through it, drawing down the upper skin 6 and pinching it off against the bottom skin 7 at the bottom of the pan. After the divider is withdrawn, the sides of the fractional biscuit parts 5 come together as shown in Fig. 7. The drawing down of the top of the dough will cause the top of the individual biscuit parts to have the round-shaped appearance shown in Fig. 2. While it is preferable to use the form of divider shown in the drawings, this is apparently not essential. In case a sharper dividing edge is used, the skin will not be drawn down as far into the dough but will be broken between the fractional biscuit parts near the top of the dough. Moreover, in case the dough does not have a sufficiently tough and ductile skin, the skin will not be carried through the dough and pinched off against the bottom, but will be broken between the fractional biscuit parts near the top of the dough. However, in such cases, even though the skin is not carried through the dough and pinched off against the bottom, the top of the dough is drawn down into the depressions formed between the fractional parts so that the top of the dough is substantially covered with skin. This gives the proper crust to the top of the biscuit. It also serves to prevent the escape of gas during subsequent proofing. If the divider ruptures the skin in going through the dough, such ruptures occur below the upper surface of the dough and between the fractional parts. When the dividing blades are withdrawn, the soft dough, on account of its resiliency, will close in and the sides of the fractional biscuit parts will be in contact. Thus, any raw edges formed by a ruptured skin between the individual parts will be protected. Therefore, when the loaf is ready to go to the oven, the exposed parts of the biscuit are covered with skin which gives a good crust and prevents the escape of the gases. The subdivided pieces or biscuit parts, although they come together close enough to protect any raw edges, never grow together to such an extent that the baked biscuits cannot be easily broken apart. The places in the dough where the dividers pass through it persist in the baked product as surfaces or planes of cleavage along which the individual biscuit may be readily broken apart. The individual biscuit, however, stick tightly enough together so that the loaf may be easily handled, wrapped and shipped without breaking apart. The ease with which the individual biscuit may be broken apart after baking, is apparently dependent upon the character of dough, the toughness of the skin, and the extent to which the skin is carried into the dough. The ease with which the individual parts may be broken apart may be increased by greasing the divider blades.

The compressing and cutting of the dough which takes place in the pan biscuit machine has a tendency to expel any surplus gas which may be in the dough.

After the dough is subdivided, as shown in Fig. 2, the baking pan with the dough in it, is put into a steam box to proof or raise the dough until it is light enough to go to the oven. The condition of the dough after it is ready for the oven is indicated in Fig. 3. During the rising of the dough in the pan, the skin over the top of the dough retains the gas. Moreover, the depressions between the fractional parts where the top of the dough has been drawn down between them, are retained as the dough rises, so that the top of each fractional biscuit part is evenly rounded or dome shaped, which shape it retains when baked. The pan still containing the proofed biscuit is put into the oven and the biscuit are baked. After the pan is removed from the oven, the biscuit may be removed from the pan. It is to be particularly noted that from the time the rounded up piece of dough is put into the pan until after the biscuit are baked, the dough is not removed from the baking pan, and the uniform arrangement of the fractional parts is not disturbed, and that all individual work on the separate biscuit parts is entirely dispensed with. The cheapening in production due to the greatly decreased amount of labor is too obvious to require comment. Moreover, the loaf of biscuit produced is superior to that which it is possible to make by the old hand process. The piece of dough has a uniform grain and texture throughout so that each biscuit has the same grain and texture as all the other biscuit. It is easier to get the proper grain and texture by rounding up a piece of dough the size of that necessary for the entire pan of biscuit than it is by rounding or balling up individual biscuit. When the individual biscuits are balled up by hand and placed in the pan as heretofore, not only are some of the individual biscuit likely to be balled up harder than others, but it is impossible by hand to place the biscuit in the pan in the regular and uniform arrangement which is made possible by the present method. The curvature of the tops of the biscuits as made by the present method is the same in each and every biscuit and may be regulated by varying the condition of the dough. When biscuit are formed by hand the curvature of the tops of the biscuits must of necessity vary with individual biscuit and with the skill of the baker's hand.

While the preferred procedure has been specifically described, it is to be understood that the method is not limited to all of the details of the hereinbefore described procedure but may be practised within its scope as defined in the following claims:

1. The method of making a pan of biscuit in which the biscuit have a regular shape and arrangement and may be readily broken apart, comprising, rounding up a piece of soft dough to give it the proper grain and texture and to form an outer skin, placing the rounded up piece of dough in a baking pan, forming the piece of dough into rounded top fractional parts by subdividing it and drawing down the top of the dough between the parts leaving the top of the dough substantially covered with skin and the sides of the fractional parts in contact with each other, and proofing and baking the dough while it remains in the pan.

2. The method of making a pan of biscuit in which the biscuits have a regular shape and arrangement and may be readily broken apart, comprising, rounding up a piece of soft dough to give it the proper grain and texture and to form an outer skin, placing it in a baking pan, compressing the dough to flatten it and fill the bottom of the pan, and while so compressed, forcing through the dough a dough divider having cutting edges so arranged as to draw down the top of the dough and subdivide it into fractional parts the shape and arrangement of which are predetermined by the divider, and in proofing and baking the dough while it remains in the pan.

3. The method of making a pan of biscuit in which the biscuits have a regular shape and arrangement and may be readily broken apart, comprising, rounding up a piece of soft dough, placing the rounded up piece of dough in a baking pan and subdividing it into fractional parts, and proofing and baking it while it remains in the pan without separating the fractional parts or disturbing their arrangements.

4. The method of making a pan of biscuit in which the biscuit have a regular shape and arrangement and in which the planes of cleavage between the biscuit persist in the baked product, comprising, placing a piece of soft dough having an outer skin in a baking pan, forming the shape and arrangement of the biscuit and the cleavage planes between them by subdividing the piece of dough so that the outer skin is drawn down below the top of the dough and between the fractional parts leaving the top of each fractional part substantially covered with skin, and proofing and baking the thus subdivided dough while it remains in the pan.

ASHLEY F. WARD.

Witnesses:
M. SKOKAN,
J. S. GRAVELY.